United States Patent

Manders

[11] Patent Number: 5,841,246
[45] Date of Patent: Nov. 24, 1998

[54] CIRCUIT ARRANGEMENT FOR CONTROLLING LUMINOUS FLUX OF A DISCHARGE LAMP

[75] Inventor: Stephan Manders, Eindhoven, Netherlands

[73] Assignee: Flat Panel Display Co. (FPD) B.V. Prof. Holstlaan 4, Eindhoven, Netherlands

[21] Appl. No.: 677,241

[22] Filed: Jul. 9, 1996

[30] Foreign Application Priority Data

Jul. 10, 1995 [EP] European Pat. Off. .............. 95201880

[51] Int. Cl.⁶ .................................................. H05B 41/00
[52] U.S. Cl. .......................... 315/307; 315/291; 315/224
[58] Field of Search ................... 315/307, 291, 315/DIG. 7, 308, DIG. 4, 224

[56] References Cited

U.S. PATENT DOCUMENTS 5,105,127  4/1992  Lavaud ..................................... 315/291
5,243,261  9/1993  Bergervoet et al. ..................... 315/248

*Primary Examiner*—Arnold Kinkead
*Attorney, Agent, or Firm*—John C. Fox

[57] ABSTRACT

A circuit arrangement for the square-wave modulated high-frequency voltage operation of a discharge lamp, including means to control the duty cycle of the square wave, has a measuring circuit for detecting the ignition of the discharge lamp during each cycle of the substantially square-wave modulation and a timer circuit coupled to the measuring circuit for rendering the amplitude of the high-frequency voltage substantially equal to zero when a time interval has elapsed after the ignition of the discharge lamp, whereby the luminous flux of the discharge lamp fluctuates to a low degree only.

6 Claims, 2 Drawing Sheets

CIRCUIT ARRANGEMENT FOR CONTROLLING LUMINOUS FLUX OF A DISCHARGE LAMP

BACKGROUND OF THE INVENTION

The invention relates to a circuit arrangement for operating a discharge lamp by means of a high-frequency voltage, comprising
  input terminals for connection to a supply voltage source,
  means I for generating the high-frequency voltage from a supply voltage delivered by the supply voltage source,
  means II for the substantially square-wave modulation of the amplitude of the high-frequency voltage, provided with means III for controlling the duty cycle of the square wave.

The invention also relates to a picture display device provided with an LED screen, a discharge lamp, and a circuit arrangement as above.

Such a circuit arrangement is known from U.S. Pat. No. 5,105,127. The known circuit arrangement is used for operating a discharge lamp which serves as a backlight of an LCD screen. The high-frequency voltage is used for generating a high-frequency lamp current. The means III for controlling the duty cycle of the square-wave modulation of the high-frequency voltage render it possible to control the luminous flux of the discharge lamp and thus the brightness of the LCD screen. The discharge lamp ignites under the influence of the high-frequency voltage at the start of each square wave of the substantially square-wave modulation of the high-frequency voltage. At the end of each square wave the discharge lamp extinguishes because the amplitude of the high-frequency voltage becomes substantially equal to zero. The time fraction during which a high-frequency voltage is present across the discharge lamp is thus controlled by means of the substantially square-wave modulation. A disadvantage of the known circuit arrangement, however, is that the discharge lamp ignites under the influence of the high-frequency voltage only after the lapse of a certain time interval, the ignition time, at the beginning of each square wave. The length of this ignition time strongly depends on, for example, the temperature, such that the brightness of the LCD screen is lower at a low temperature than at a higher temperature, given a certain duty cycle of the substantially square-wave modulation. Indeed, the length of the ignition time is not constant even during stationary lamp operation, but fluctuates, so that the length of the time interval during which the discharge lamp burns within a cycle of the substantially square-wave modulation fluctuates. This fluctuation has the result that the luminous flux of the discharge lamp, and thus the brightness of the LCD screen also fluctuates, especially when the duty cycle of the substantially square-wave modulation is comparatively low.

OBJECTS AND SUMMARY OF THE INVENTION

It is an object of the invention to provide a circuit arrangement with which a discharge lamp can be operated and the luminous flux of the discharge lamp can be controlled such that this luminous flux fluctuates in time to a comparatively low degree only, especially when said luminous flux has a comparatively low value. It is another object of the invention to provide a picture display device comprising an LCD screen, a discharge lamp, and a circuit arrangement for operating the discharge lamp wherein the brightness of the LCD screen can be controlled such that this brightness fluctuates in time to a comparatively low degree only, even when this brightness has a comparatively low value.

According to the invention, a circuit arrangement as mentioned in the opening paragraph is for this purpose characterized in that the means III are provided with a measuring circuit for detecting the ignition of the discharge lamp during each cycle of the substantially square-wave modulation and with a timer circuit coupled to the measuring circuit for rendering the amplitude of the high-frequency voltage substantially equal to zero when a time interval has elapsed after the ignition of the discharge lamp.

A picture display device as mentioned in the second paragraph is for this purpose provided with a circuit arrangement according to the invention.

The measuring circuit detects the ignition of the discharge lamp during each square wave of the high-frequency voltage. The timer circuit coupled to the measuring circuit renders the amplitude of the high-frequency voltage substantially equal to zero when the time interval after the ignition of the discharge lamp has elapsed, so that the discharge lamp extinguishes. It is achieved thereby that the time interval during which the discharge lamp burns is controlled in each square wave. Since the time interval during which the discharge lamp burns is controlled, the luminous flux of the discharge lamp fluctuates in time yo a low degree only. For this same reason a picture display device according to the invention has only small brightness fluctuations.

A further important advantage of a circuit arrangement according to the invention relates to the first ignition of the discharge lamp upon switching-on of the circuit arrangement. Depending on, for example, the ambient temperature or the time during which the discharge lamp has been in dark surroundings without burning, this first ignition of the discharge lamp may take a comparatively long time. When a known circuit arrangement is used, the high-frequency voltage generated by the circuit arrangement is modulated into substantially a square-wave shape also during the ignition phase, which means that the ignition may proceed with great difficulty. When a circuit arrangement according to the invention is used, however, the high-frequency voltage is not modulated into a substantially square-wave shape during the ignition of the discharge lamp but is present unmodulated, so that the discharge lamp ignites comparatively quickly for the first time.

The measuring circuit may be realized, for example, by means of a light sensor. A comparatively simple and accordingly inexpensive manner of realizing the measuring circuit is, however, by means of a diode bridge and an ohmic resistor which are coupled to the means I. This coupling may be so designed that the ohmic resistor passes current when the discharge lamp is burning and (substantially) no current when it is in the extinguished state.

In a preferred embodiment of a circuit arrangement according to the invention, the means II comprise a switching element which is coupled between an input terminal and the means I. In this preferred embodiment of a circuit arrangement according to the invention, the means II are realized in a comparatively simple and also reliable manner.

A further embodiment of a circuit arrangement according to the invention comprises means for adjusting the length of the time interval during which the discharge lamp burns during each square wave. It is possible to dim the discharge lamp with these means.

A preferred embodiment of a picture display device according to the invention comprises means for the periodic build-up of a picture on the LCD screen with a frequency which is equal to the frequency of the substantially square-wave modulation of the high-frequency voltage. In this preferred embodiment of a picture display device according to the invention, it is prevented that interference occurs between the substantially square-wave modulation of the high-frequency voltage and the periodic build-up of a picture on the LCD screen.

BRIEF DESCRIPTION OF THE DRAWINGS

Embodiments of a circuit arrangement and a picture display device according to the invention will be explained with reference to a drawing, in which.

DETAILED DESCRIPTION OF THE PREFERRED

Figure 1:
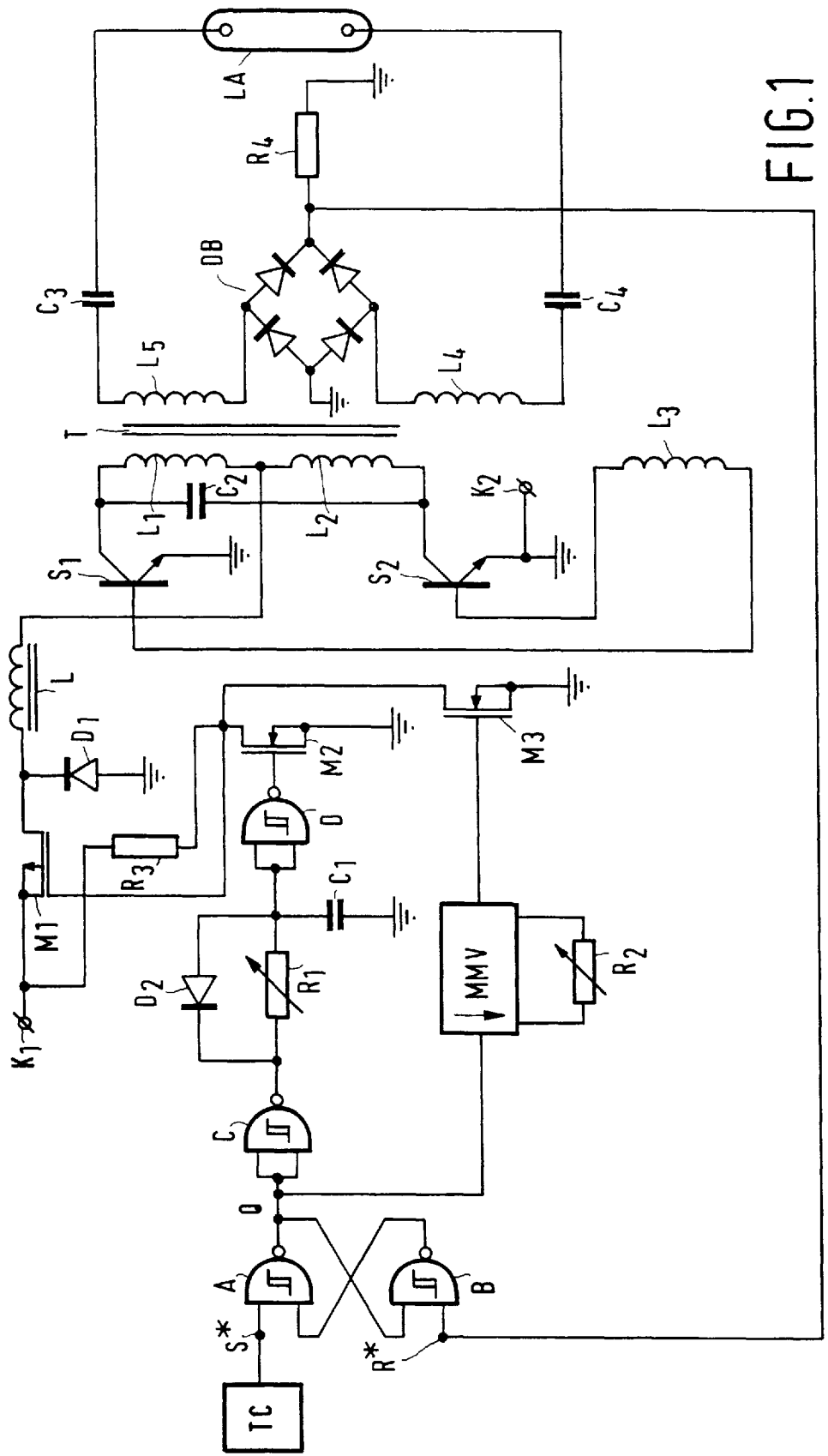
FIG. 1 is a circuit diagram of an embodiment of an arrangement according to the invention, with a discharge lamp connected thereto.

In FIG. 1, K1 and K2 form input terminals for connection to a supply voltage source. The potential of input terminal K2 is equal to ground potential during lamp operation. Inductive element L, switching elements S1 and S2, transformer T provided with primary windings L1, L2 and L3 and with secondary windings L4 and L5, and capacitors C2, C3 and C4 together form means I for generating a high-frequency voltage from a supply voltage delivered by the supply voltage source. The means I in FIG. 1 are coupled to a discharge lamp LA. All other components of the circuit arrangement together form means II for the substantially square-wave modulation of the amplitude of the high-frequency voltage. Circuit portion TC here is a signal generator for generating a periodic signal with the same frequency as the substantially square-wave modulation. Diode bridge DB and ohmic resistor R4, which in this embodiment form a measuring circuit for detecting the ignition of the discharge lamp, circuit portions A, B, C and D, diode D2, variable resistors R1 and R2, capacitor C1, monostable multivibrator MMV, switching elements M2 and M3, and resistor R3 form means III for adjusting the duty cycle of the square wave. Diode D2, capacitor C1, variable resistors R1 and R2 and monostable multivibrator MMV together with circuit portion D, switching elements M2 and M3, and resistor R3 form a timer circuit for rendering the amplitude of the high-frequency voltage substantially equal to zero when a time interval has elapsed after the ignition of the discharge lamp.

Input terminal K1 is connected to a common junction point of primary windings L1 and L2 by means of a series arrangement of switching element M1 and inductive element L. Diode D1 connects input terminal K2 to a common junction point of switching element M1 and inductive element L. Primary windings L1 and L2 are connected in series and are shunted by capacitor C1. A first end of the series arrangement of primary windings L1 and L2 is connected to a main electrode of switching element S1. A second end of the series arrangement of primary windings L1 and L2 is connected to a first main electrode of switching element S2. A second main electrode of switching element S1 is, as is a second main electrode of switching element 2, connected to input terminal K2. A control electrode of switching element S1 is connected to a control electrode of switching element S2 via primary winding L3. A first end of secondary winding L5 is connected to a first electrode of the discharge lamp LA via capacitor C3. A first end of secondary winding L4 is connected to a second electrode of the discharge lamp LA via capacitor C4. Further ends of secondary windings L4 and L5 are connected to respective inputs of diode bridge DB. A first output of diode bridge DB is connected to input terminal K2. A further output of diode bridge DB is also connected to input terminal K2 via resistor R4. A junction point of diode bridge DB and ohmic resistor R4 is connected to an input R* of circuit portion B. Circuit portions A and B are each formed by a NAND gate. A further input of circuit portion B is connected to an output of circuit portion A. An output of circuit portion B is connected to an input of circuit portion A. A further input S* of circuit portion A is connected to an output of circuit portion TC. Circuit portion A and circuit portion B together form a latch. The output of circuit portion A is connected to an input of circuit portion C, which forms an inverter. An output of circuit portion C is connected to input terminal K2 via a series arrangement of variable resistor R1 and capacitor C1. Variable resistor R1 is shunted by a diode. A junction point of variable resistor R1 and capacitor C1 is connected to an input of circuit portion D, which also forms an inverter. An output of circuit portion D is connected to a control electrode of switching element M2. A first main electrode of switching element M2 is connected to input terminal K2. A further main electrode of switching element M2 is connected to terminal K1 via resistor R3. A junction point of resistor R3 and switching element M2 is connected to a control electrode of switching element M1. The output of circuit portion A is also connected to an input of monostable multivibrator MMV. Monostable multivibrator MMV comprises variable resistor R2. An output of monostable multivibrator MMV is coupled to a control electrode of switching element M3. A first main electrode of switching element M3 is connected to input terminal K2, and a further main electrode of switching element M3 is connected to the junction point of switching element M2 and resistor R3.

The operation of the circuit arrangement shown in FIG. 1 is as follows.

When the input terminals K1 and K2 are connected to a supply voltage source, signal generator TC generates a pulsatory signal with a frequency f. After a pulse of this pulsatory signal the output of circuit portion A becomes high. As a result, the output of circuit portion C becomes low, so that capacitor C1 is discharged through diode D2. The input of circuit portion D becomes low as a result, and its output high, so that switching element M1 becomes conducting via switching element M2. After switching element M1 has been made conducting, the switching elements S1 and S2 are rendered conducting and nonconducting alternately with high frequency via primary winding L3. A high-frequency voltage is present across the discharge lamp LA as a result. The discharge lamp LA, which is in the extinguished state, subsequently ignites as a result of this high-frequency voltage. This ignition of discharge lamp LA is detected in that ohmic resistor R4 passes current and thus supplies a signal to the input R* of the latch formed by circuit portions A and B. The latch is reset by this signal: the output of circuit portion A becomes low, the output of circuit portion C high, and capacitor C1 is charged through variable resistor R1. At the same time, the input of monostable multivibrator MMV becomes low because the output of circuit portion A has become low. As a result, the output of monostable multivibrator MMV becomes high during a time interval whose length is determined by the resistance value of variable resistor R2. During this time interval the switching element M3 is conducting. When the voltage across capacitor C1 has reached a threshold value, upon which the output of circuit portion D becomes low, the switching element M2 is rendered non-conducting. As long as either or both of the switching elements M2, M3 is/are conducting, the switching element M1 is also conducting. The moment the last one of the two switching elements M2 and M3 has become non-conducting, the switching element M1 also becomes non-conducting. The means I are disconnected from the supply voltage source thereby, so that the voltage across the discharge lamp LA comes substantially equal to zero and the discharge lamp LA extinguishes. The cycle described above is repeated at each subsequent pulse generated by the circuit portion TC.

It is possible in the manufacture of practical realizations of the embodiment shown in FIG. 1, for example, to set the resistance value of variable resistor R1 in conformity with the lowest duty cycle of the square-wave modulation at which the discharge lamp LA still operates in a stable manner. In such practical realizations, the adjustment of the variable resistor R2 may then be made available to the user of the circuit arrangement as a dimming facility. A user cannot dim the discharge lamp to the extent that the lamp no longer shows a stable operation when using these practical realizations of the embodiment shown in FIG. 1, because the lowest dimmed position is indeed determined by the conduction time of switching element M2, which in its turn is determined by the resistance value of variable resistor R1.

Figure 2:
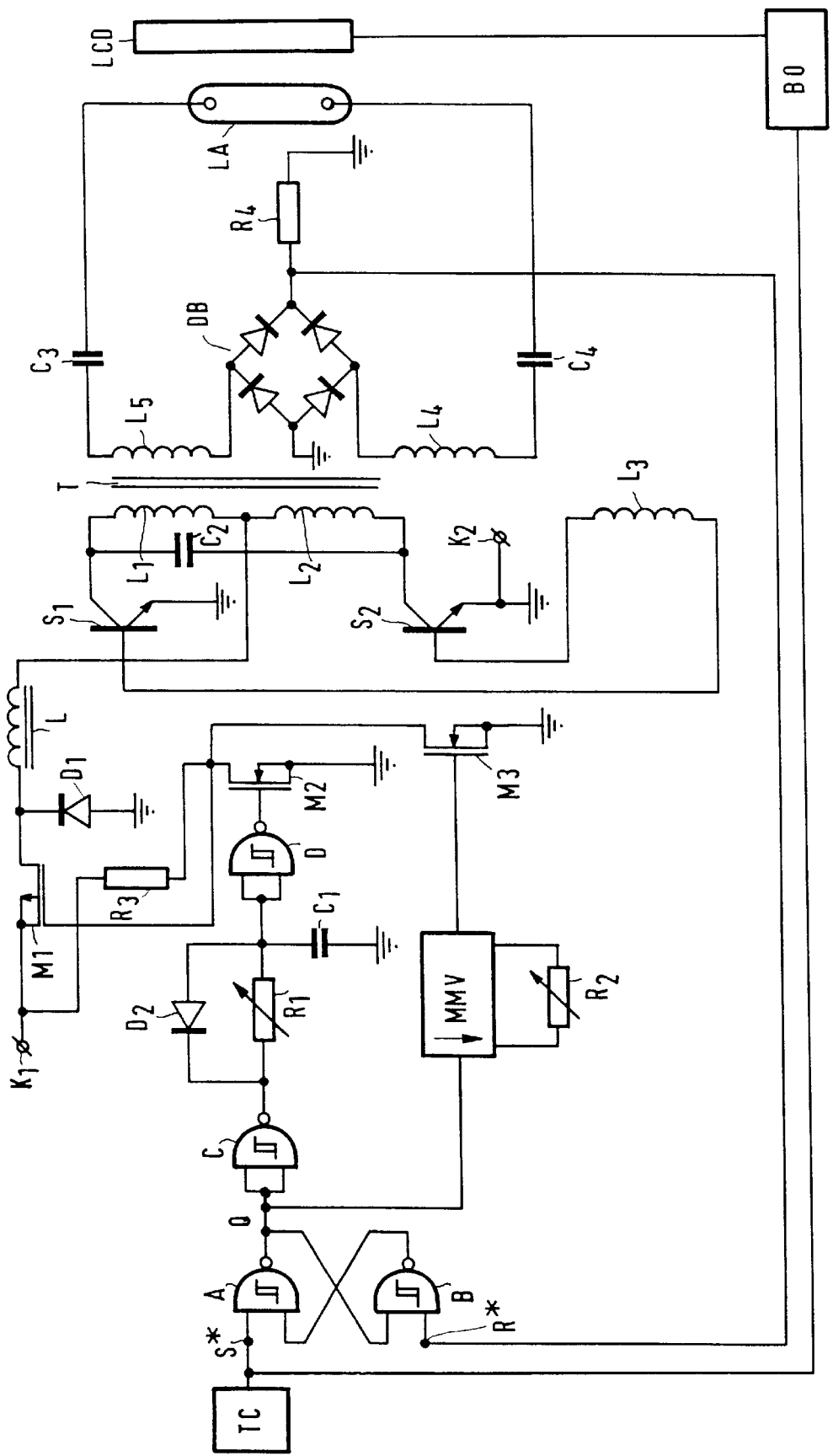
FIG. 2 is a diagram of the construction of an embodiment of a picture display device according to the invention.

The picture display device shown in FIG. 2 comprises a circuit arrangement coupled to a discharge lamp as shown in FIG. 1. The picture display device also comprises an LCD screen and a circuit portion BO which in this embodiment forms means for the periodic build-up of a picture on the LCD screen with a frequency equal to the frequency of the substantially square-wave modulation of the high-frequency voltage generated by means I.

The output of circuit portion TC is connected to an input of circuit portion BO, and an output of circuit portion BO is connected to an input of screen LCD. Screen LCD is so positioned relative to the discharge lamp LA that a good distribution of the luminous intensity over the entire LCD screen is obtained.

The operation of the picture display device shown in FIG. 2 is as follows.

Each pulse generated by circuit portion TC during operation of the picture display device leads to the generation of a signal at the output of circuit portion BO which changes the picture on screen LCD via the input of this screen LCD. Since each pulse generated by circuit portion TC also initiates a square wave of the substantially square-wave modulation, the substantially square-wave modulation of the high-frequency voltage and the build-up of the picture on the LCD screen have the same frequency and are thus synchronized. It is achieved thereby that no interference takes place between these two signals, so that the picture formed on the LCD screen has practically no unpleasant bands and/or lines.

I claim:
1. A circuit arrangement for operating a discharge lamp by means of a high-frequency voltage, comprising
   input terminals for connection to a supply voltage source,
   means I for generating the high-frequency voltage from a supply voltage delivered by the supply voltage source,
   means II for the substantially square-wave modulation of the amplitude of the high-frequency voltage, provided with means III for controlling the duty cycle of the square wave,
characterized in that the means III are provided with a measuring circuit for detecting the ignition of the discharge lamp during each cycle of the substantially square-wave modulation and with a timer circuit coupled to the measuring circuit for rendering the amplitude of the high-frequency voltage substantially equal to zero when a time interval has elapsed after the ignition of the discharge lamp for each cycle, wherein the length of the time interval during which the lamp burns is controlled.

2. A circuit arrangement as claimed in claim 1, wherein the measuring circuit comprises a diode bridge and an ohmic resistor coupled to the means I.

3. A circuit arrangement as claimed in claim 1, wherein the means II comprise a switching element which is coupled between an input terminal and the means I.

4. A circuit arrangement as claimed in claim 1, wherein the means II are in addition provided with means for adjusting the duration the time interval.

5. A picture display device comprising an LCD screen, a discharge lamp for illuminating the LCD screen and a circuit arrangement for operating a discharge lamp by means of a high-frequency voltage, comprising
   input terminals for connection to a supply voltage source,
   means I for generating the high-frequency voltage from a supply voltage delivered by the supply voltage source,
   means II for the substantially square-wave modulation of the amplitude of the high-frequency voltage, provided with means III for controlling the duty cycle of the square wave,
characterized in that the means III are provided with a measuring circuit for detecting the ignition of the discharge lamp during each cycle of the substantially square-wave modulation and with a timer circuit coupled to the measuring circuit for rendering the amplitude of the high-frequency voltage substantially equal to zero when a time interval has elapsed after the ignition of the discharge lamp for each cycle, wherein the length of the time interval during which the lamp burns is controlled.

6. A picture display device as claimed in claim 5, comprising means for the periodic build-up of a picture on the LCD screen with a frequency which is equal to the frequency of the substantially square-wave modulation of the high-frequency voltage.

* * * * *